United States Patent [19]
Sheldon

[11] Patent Number: 5,960,617
[45] Date of Patent: *Oct. 5, 1999

[54] LAWN MOWER CUTTING BLADE SPINDLE ASSEMBLY INCLUDING QUICK CHANGE CHARACTERISTICS

[75] Inventor: John D. Sheldon, Chandler, Ariz.

[73] Assignee: Snapper, Inc., McDonough, Ga.

[ * ] Notice: This patent is subject to a terminal disclaimer.

[21] Appl. No.: 09/116,193

[22] Filed: Jul. 15, 1998

[51] Int. Cl.$^6$ .................................................. A01D 34/03
[52] U.S. Cl. ........................... 56/17.5; 56/255; 56/295
[58] Field of Search .................... 56/17.5, 255, DIG. 20, 56/295, DIG. 17, DIG. 22

[56] References Cited

U.S. PATENT DOCUMENTS

| | | |
|---|---|---|
| 2,551,817 | 5/1951 | Taylor . |
| 3,722,642 | 3/1973 | Zurek et al. . |
| 3,798,987 | 3/1974 | Hurd et al. ........................ 74/230.01 R |
| 3,875,728 | 4/1975 | Bacon . |
| 3,890,773 | 6/1975 | Frost ........................................ 56/255 |
| 3,894,383 | 7/1975 | Weis et al. ............................... 56/17.5 |
| 3,916,706 | 11/1975 | Shaw . |
| 3,967,438 | 7/1976 | Tombers . |
| 4,366,995 | 1/1983 | Kocian ..................................... 308/26 |
| 4,478,029 | 10/1984 | Moore et al. . |
| 4,989,398 | 2/1991 | Kuhn et al. . |
| 5,066,146 | 11/1991 | McDonner . |
| 5,117,617 | 6/1992 | Scag . |
| 5,299,414 | 4/1994 | Long ........................................ 56/17.4 |
| 5,481,857 | 1/1996 | Umemoto et al. . |
| 5,483,790 | 1/1996 | Kuhn et al. . |
| 5,507,586 | 4/1996 | Myszka . |
| 5,782,073 | 7/1998 | Sheldon .................................. 56/17.5 |

*Primary Examiner*—Thomas B. Will
*Assistant Examiner*—Arpad Fabian Kovacs
*Attorney, Agent, or Firm*—Jones & Askew

[57] ABSTRACT

The present invention provides a lawn mower blade spindle assembly which can be easily serviced in the field, which includes a blade height adjustment feature which allows a blade to be replaced or be adjusted without removing the blade spindle bearings. An improved stress loading arrangement is further provided which reduces spindle stress and lessens the opportunity for spindle assembly failure upon catastrophic blade impact with an immovable object such as with a rock.

40 Claims, 4 Drawing Sheets

LAWN MOWER CUTTING BLADE SPINDLE ASSEMBLY INCLUDING QUICK CHANGE CHARACTERISTICS

TECHNICAL FIELD

This invention relates in general to lawn mowers, and more specifically, to belt driven pulley or "sheave" arrangements for multi-spindle mower decks.

BACKGROUND OF THE ART

Conventional mowers provide an engine (or "motor") which drives a belt. The belt engages and drives a pulley or sheave mounted on the upper portion of a shaft or spindle. The spindle is rotatably supported by bearings within a housing carried by the mower deck or frame. A lower portion of the spindle extends below the housing and has a mower blade mounted thereto for rotation with the spindle. Therefore, it may be seen that the belt drives the blade through the spindle.

One example of a spindle assembly according to the prior art is such as that shown in U.S. Pat. No. 4,989,398 to Kuhn, et al., entitled "Keyless Sheave and Spindle", issued Feb. 5, 1991. In this patent, a configuration is shown which includes a pulley structure has a generally circular opening through its center, and a spindle having a neck portion of generally circular cross section which can rotate relative to the pulley, thus allowing the pulley to rotate relative to the spindle except for the provision of frictional force therebetween.

Although the above-referenced prior art configurations have found certain acceptance, improvements to spindle configurations are always welcome.

SUMMARY OF THE INVENTION

The present invention overcomes deficiencies in the prior art by providing a lawn mower blade spindle assembly which can be easily serviced in the field, which includes a blade height adjustment feature which allows a blade to be replaced or be adjusted without removing the blade spindle bearings. An improved stress loading arrangement is further provided which reduces spindle stress and lessens the opportunity for spindle assembly failure upon catastrophic blade impact with an immovable object such as a rock.

Therefore, it is an object of the present invention to provide an improved blade spindle assembly.

It is a further object of the present invention to provide a blade spindle assembly which is easy to service in the field.

It is a further object of the present invention to provide a blade spindle assembly which provides for vertical adjustment of the blade relative to the cutter housing.

It is a further object of the present invention to provide a blade spindle assembly which is durable.

It is a further object of the present invention to provide a blade spindle assembly which can be readily assembled and disassembled.

It is a further object of the present invention to provide a blade spindle assembly which allows for quick and consistent bearing replacement.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Reference is now made to the drawings, in which like numerals represent like items throughout the several views.
General Construction and Operation As shown generally by FIGS. 1–4, a spindle assembly 10 according to the present invention includes a spindle support housing 20, a pair of bearings 30, a bearing spacer 40, a quick-change spindle shaft 50, a bearing subassembly retainer 60, a through bolt 70 (having a cooperating nut 71), a plurality of spacer washers 80, a pulley 90, and a pulley spacer 32.

When the spindle assembly 10 is assembled, the through bolt 70 passes through the blade 11, the spacers 80, the spindle shaft 50, the bearing spacer 40, the bearings 30, the support housing 20, the pulley spacer 92, and the pulley 90, to be captured at its upper end by nut 71. When assembled, the spindle shaft 50 passes through the bearings 30 and the bearing spacer 40, through the bearing retainer ring 60, the pulley spacer 92, and has splines which engage the central hole of the pulley 90.

Figure 1:
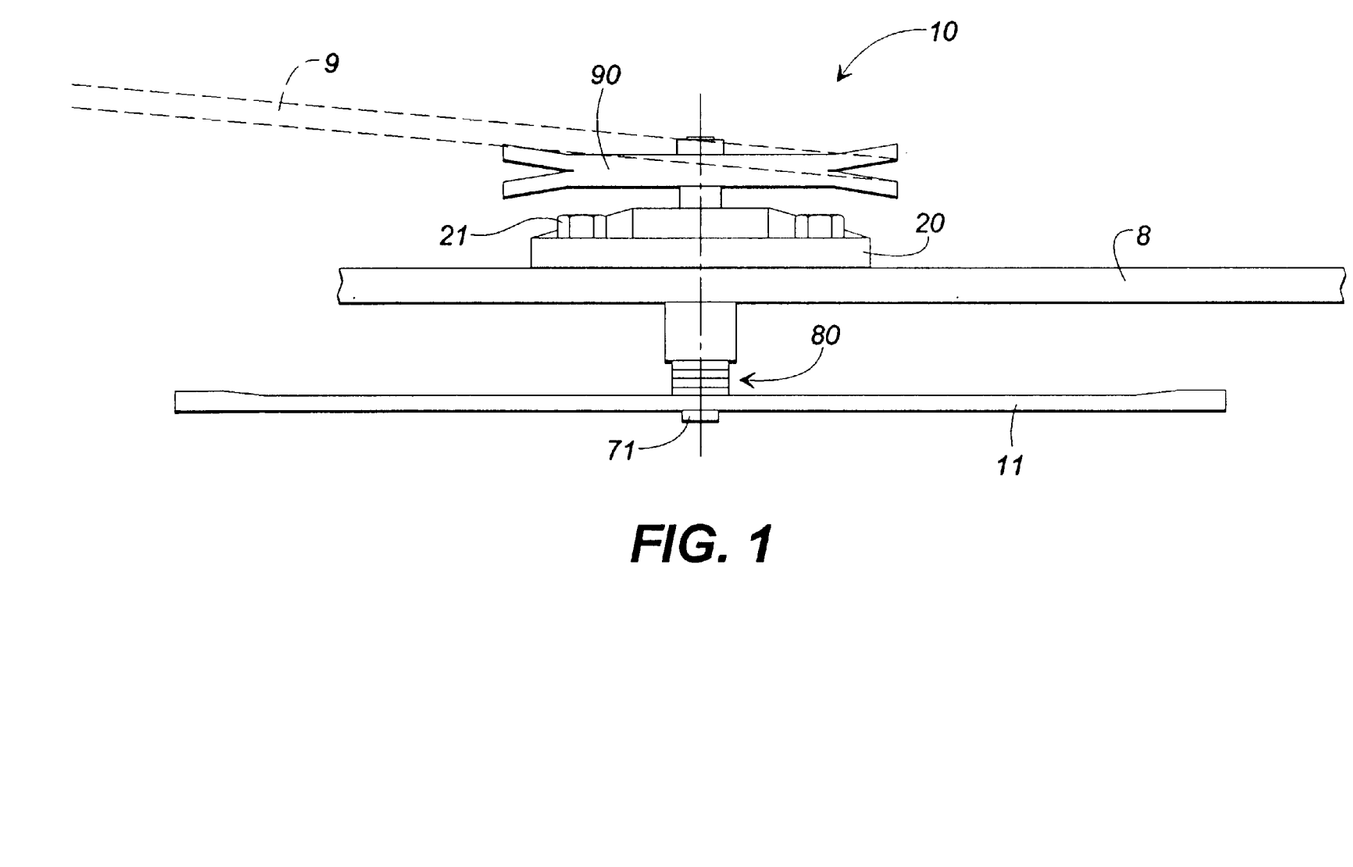
FIG. 1 is a side partial cross-sectional view of a spindle assembly 10 used according to the present invention.

During operation, torque is transferred between the blade 11 and the pulley 90 through means of the quick change spindle shaft 50, which is rotatably mounted relative to the support housing 20.
More Detailed Discussion The spindle support housing 20 is configured to be attached relative to an upper wall 8 of a conventional cutter housing such as shown in FIG. 1. One or more fasteners such as bolts 21 pass through holes 22 (see FIG. 3) in the spindle support housing 20 may be used to fasten the housing relative to the cutter housing 8, and it may be understood that more than one 10 may be used within a particular cutter housing. The support housing 20 may be made of cast iron or other suitable cast or machined metal, or of any other material considered suitable for its intended purpose.

The bearings 30 may be as conventionally used for such a cutting blade application. As described elsewhere in this application they provide rotational support of the hollow spindle shaft 50, and thus allow rotation of the shaft 50 and the attached blade 11 while providing axial and radial load support.

The bearing spacer 40 is substantially elongate and tubular in nature, and when installed serves to provide spacing between the inner races of the bearings 30, transferring radial force downwardly from the upper bearing's inner race to the lower bearing's inner race as described elsewhere in this application.

The quick-change spindle shaft 50 is substantially elongate except for its lower end face member 51 which includes a downwardly-directed friction surface 52 which is configured to frictionally contact the blade 11 or to contact an intermediate spacer. Torque is transferred from the pulley 90 to the spindle shaft 50 through a splined interconnection therebetween.

Figure 2A:
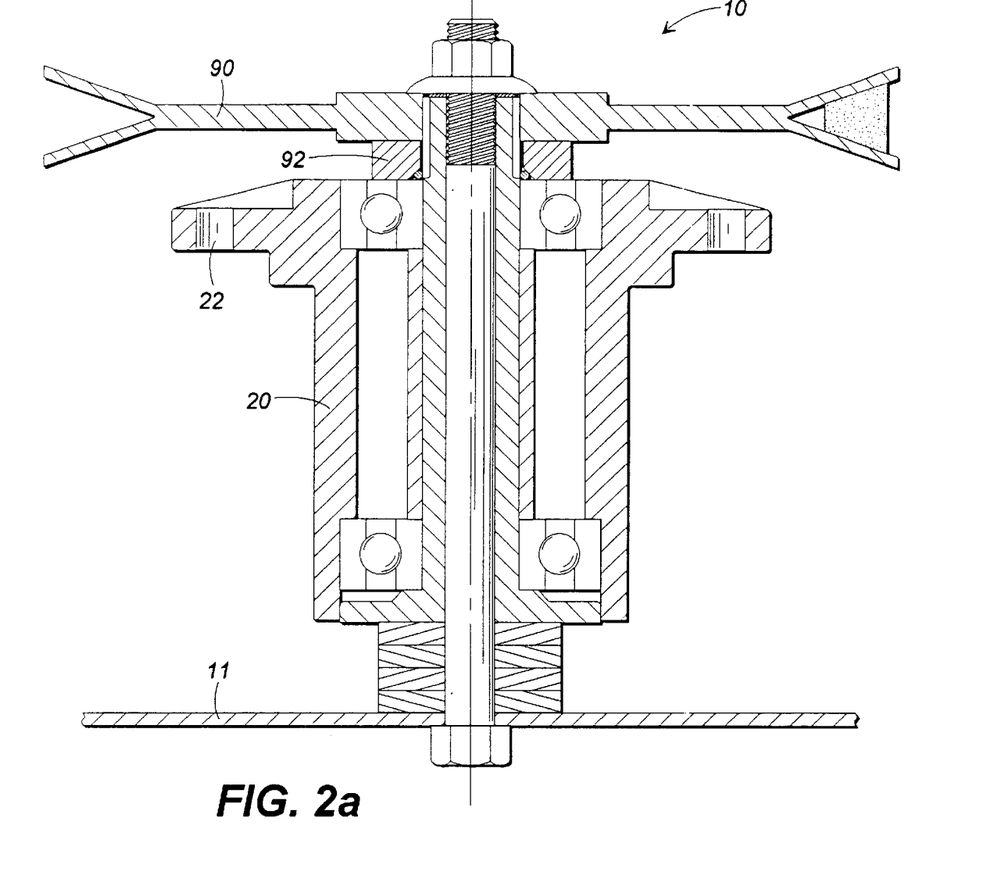
FIG. 2 is a more detailed view of the spindle assembly of FIG. 1.
Figure 2B:
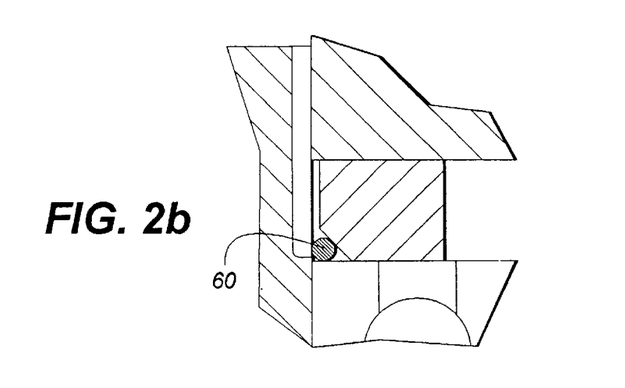
Figure 3:
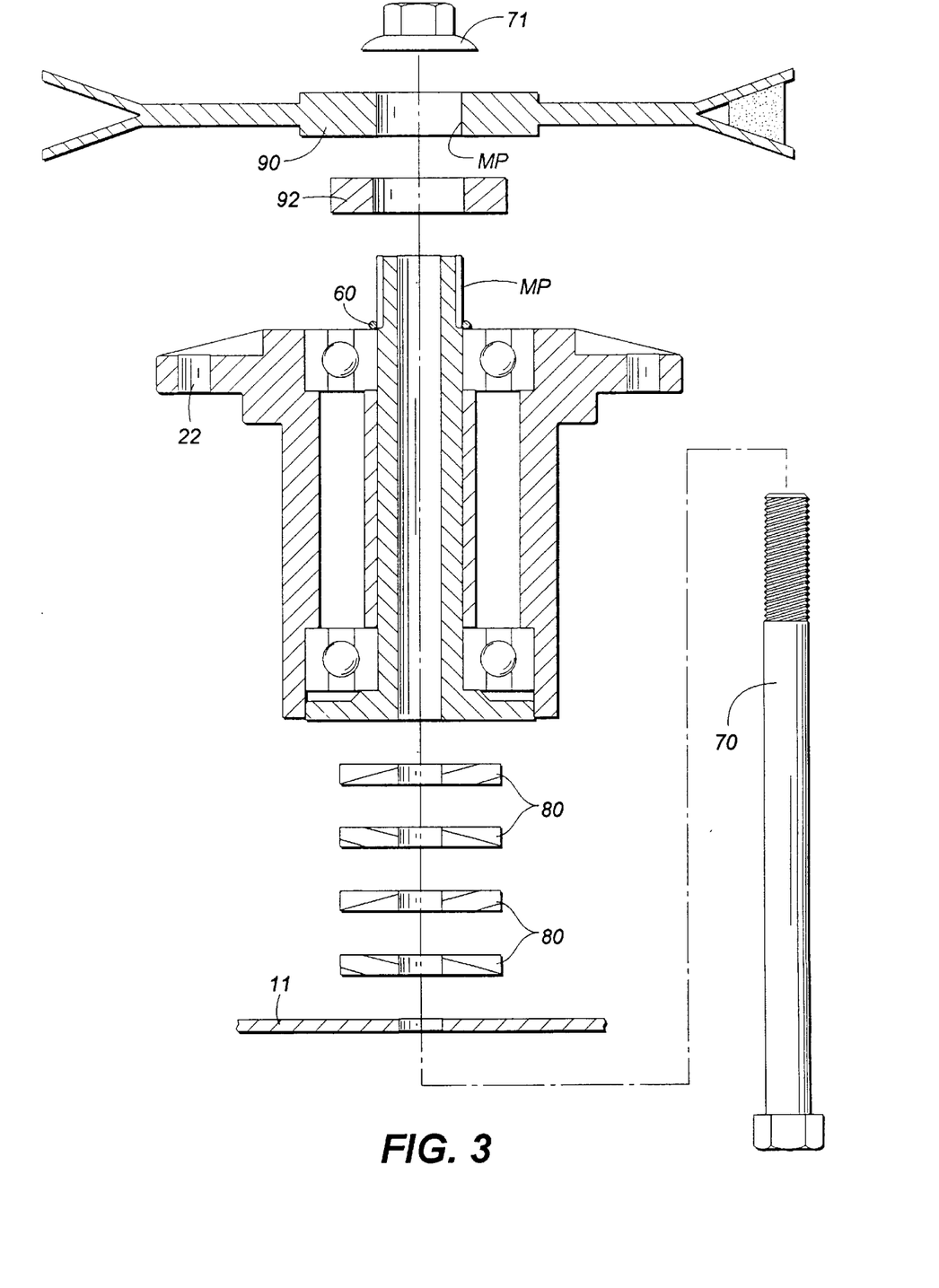
FIG. 3 is a view similar to that of FIG. 2, except that the spindle assembly is shown in partially exploded view.

The snap ring retainer 60 is made of thin music wire (e.g., 0.042" diameter), and is configured to fit around the spindle shaft 50 such as shown in FIGS. 2 and 3. In the preferred embodiment, the ring 60 snaps within an annular groove (not shown) around the spindle shaft, or alternately can be configured to engage the outer diameter of the spindle shaft by friction alone, without the use of a groove.

The through bolt 70 may be, for example, a conventional ⅝-18 grade 5 bolt, although other bolts or fasteners may be used without departing from the spirit and scope of the present invention.

The spacers 80 may be washer-shaped, preferably flat washer-shaped in one preferred embodiment.

The pulley 90 has a central hole defining a splined mating portion MP which in the preferred embodiment accepts the splines of the upper end of the spindle shaft 50, to prevent rotational movement therebetween. Therefore its may be understood that the pulley 90 and the spindle shaft 50 are not free to rotate relative to each other due to the splined connection. It should be understood that other positive-drive configurations other than splines may be used without departing from the spirit and scope of the present invention.

Blade Replacement, Adjustment

Now referencing FIGS. 2 and 3, in order to replace the blade 11, the following method can be followed. First, the through bolt 70 is removed by removing the nut 71 from the bolt 70. The blade 11 and any spacers will come off downwardly with the through bolt 70, whereupon the blade 11 and any spacers 80 may be removed and replaced onto the through bolt as needed. The engagement between the retaining ring 60 and the outer diameter of the spindle shaft 50 keeps the spindle shaft 50 from falling out, which is especially advantageous should such as change be desired in the field. The through bolt 70 and the blade 11 and any spacers 80 thereon are then replaced within the assembly 10 atop their positions shown in FIG. 2, such that the nut 71 may be replaced and torqued as required.

It may be understood that by adding or removing spacers from between the blade 11 and the end face member 51 of the spindle shaft 50, the relative height between the blade and the cutter housing may be changed. Should some spacers 80 be removed from the bottom, they can be added to the top above the pulley 90 and below the nut 71.

A suitable chamfer is provided such as shown in exaggeration in the expanded window in FIG. 2, to allow clearance for the wire retaining ring 60.

Bearing Replacement

Figure 4:
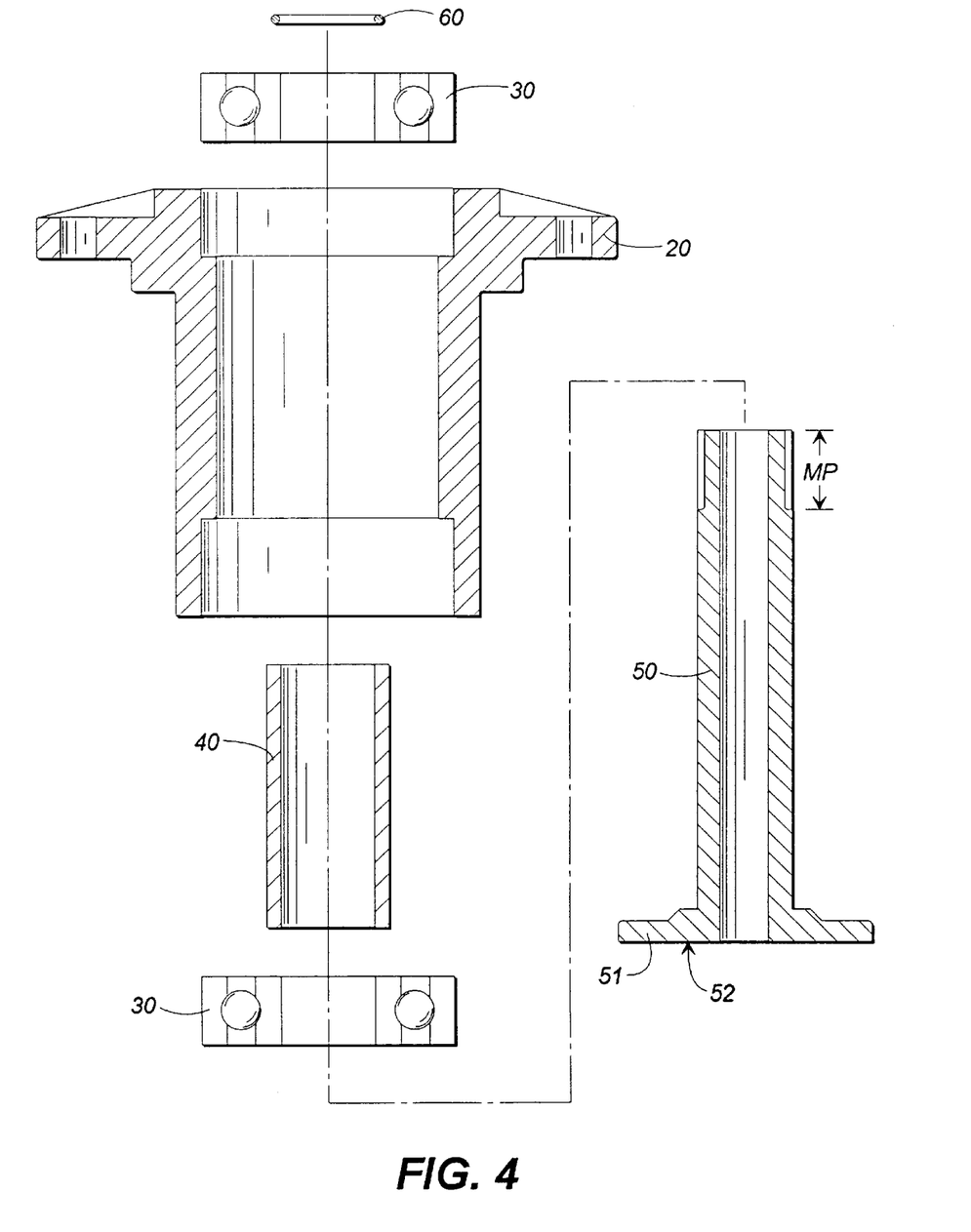
FIG. 4 is a side plan exploded view of the spindle of FIG. 3.

Reference is now made to FIG. 4. In order to replace or otherwise service the bearings 30 or the spindle shaft 50, the spindle shaft 50 must be removed from the spindle support housing 20. To do so, the blade 11, spacers 80, and through bolt must be removed as described above. The retaining ring 60 is then removed, by the use of a narrow flat screwdriver or other suitable tool. The spindle shaft 50 may then fall (or be hand pushed) downwardly such that the lower bearing also falls out or can be pulled out downwardly. The upper bearing can then be pulled upwardly and removed from its place in the spindle support housing 20. All items may be replaced or serviced as needed, and assembly is the reverse of disassembly.

It may be understood that the bearings 30 are not press-fit into the spindle support housing 20 nor are they press-fit to the spindle shaft 50. Instead, these fits are preferably "slip" fits under one embodiment of the present invention. This allows for easy replacement of the bearings while in the field if necessary, which is an important feature of the present invention.

Assembly and Operation

After assembly of all necessary parts, the flanged nut 71 is torqued to a specified state such as 50–75 ft-lbs. This causes the pulley 90 to be pushed downwardly, which pushed on the inner race of the upper bearing 30, which pushes downwardly on the bearing spacer 40, which pushes downwardly on the inner race of the lower bearing 30, which pushes downwardly on the spindle shaft end face member 51, which pushes downwardly on the spacers 80, which push down on the blade 11, which pushes down against the head of the through bolt 70.

During rotation, torque is transferred from the pulley 90 to the spindle shaft through the splined connection, and then through the frictional ring-shaped contact surface to the blade 11.

Stress Reduction

As discussed above, the present invention provides an improved stress-reducing feature. In the prior art such as Kuhn, a relatively short bolt such as 46 in Kuhn can break during exception impact. In contrast, the long through bolt 70 provided under the present invention accommodates more "twist" of the blade-securing member (the through bolt), which can reduce damage to the apparatus in general. It may also be understood that the through bolt can, under certain circumstances, be able to twist or rotate within and relative to the spindle shaft 50.

Conclusion

Therefore it may be seen that the present invention provides an improvement over the prior art by providing a lawn mower blade spindle assembly which can be easily serviced in the field, which includes a blade height adjustment feature which allows a blade to be replaced or be adjusted without removing the blade spindle bearings. An improved stress loading arrangement is further provided which reduces spindle stress and lessens the opportunity for spindle assembly failure upon catastrophic blade impact with an immovable object such as with a rock.

While this invention has been described in specific detail with reference to the disclosed embodiments, it will be understood that many variations and modifications may be effected within the spirit and scope of the invention as described in the appended claims.

What is claimed is:

1. A lawn mower cutting blade spindle subassembly for use with a cutting blade having a central mounting hole and a pulley configured for being driven by a belt, said pulley having a central mounting hole having an irregular cross section, said subassembly comprising;
    a) an elongate hollow spindle shaft interconnecting said pulley and said blade, said spindle shaft having an elongate bore extending the length thereof, said spindle shaft also including an upper end having an irregular portion having an irregular transverse cross section substantially conforming to that of said pulley mounting hole, said spindle shaft also having a bearing inner race mounting portion, said spindle shaft also defining a downwardly-directed end face configured for at least partial frictional engagement relative to said cutting blade;
    b) a spindle support housing having a longitudinal bore, said spindle support housing configured for mounting to a lawn mower cutter housing;
    c) at least one bearing intermediate said spindle shaft and said spindle support housing, said bearing including an inner race attached to said inner race mounting portion of said spindle shaft such that said spindle shaft may be rotatably supported relative to said spindle support housing by contact with said inner race of said bearing;
    d) a through bolt and nut subassembly itself comprising:
        a through bolt having a threaded first end and a head at its second, opposite end, said through bolt configured to extend through said hole in said blade, said hollow spindle shaft, and said pulley; and a nut configured to threadably engage said threaded first end of said through bolt, such that as said nut is threaded down said threaded first end of said through bolt, said nut and head of said through bolt combine to capture and compress said pulley, said bearing, and said blade, such that said blade is frictionally engaged relative to said spindle shaft to a degree sufficient to allow said spindle shaft to provide torque to said blade sufficient to cause rotation, and said pulley is positively engaged with said spindle assembly due to their respective irregular cross section, thus deterring relative rotation therebetween; and e) a retaining ring attached relative to said spindle shaft at a location on said spindle shaft intermediate said irregular portion and said bearing inner race mounting portion, said retaining ring configured to capture and retain said bearing on said elongate hollow spindle shaft even if said through bolt and nut subassembly is removed, said retaining ring when attached relative to said spindle shaft being located within an annular retaining ring clearance region at least partially defined by said spindle shaft and said at least one bearing.

2. The lawn mower cutting blade spindle assembly as claimed in claim 1, wherein said retaining ring is a snap ring.

3. The lawn mower cutting blade spindle assembly as claimed in claim 1, wherein said retaining ring is a snap ring made of wire having a substantially circular diameter.

4. The lawn mower cutting blade spindle assembly as claimed in claim 1, wherein said annular retaining ring clearance region is provided by a chamfer.

5. The lawn mower cutting blade spindle assembly as claimed in claim 4, further comprising a pulley spacer below the belt-driven portion of said pulley, wherein said annular retaining ring clearance region is provided by a chamfer in said pulley spacer.

6. The lawn mower cutting blade assembly of claim 1, wherein said blade is in direct frictional engagement with said downwardly-directed end face of said elongate hollow spindle shaft when installed.

7. The lawn mower cutting blade assembly of claim 1, further comprising at least one spacer element configured for placement intermediate said cutting blade and said hollow spindle shaft blade wherein said relative frictional engagement between said downwardly-directed end face of said elongate hollow spindle shaft and said cutting blade is provided by said spacer element, the thickness and said spacer element used affecting the height of cut of said blade.

8. A lawn mower cutting blade spindle subassembly for use with a cutting blade having a central mounting hole and a pulley configured for being driven by a belt, said pulley having a central mounting hole having an irregular cross section, said subassembly comprising:

a) an elongate hollow spindle shaft interconnecting said pulley and said blade, said spindle shaft having an elongate bore extending the length thereof, said spindle shaft also including an upper end having an irregular portion having an irregular transverse cross section substantially conforming to that of said pulley mounting hole, said spindle shaft also having a bearing inner race mounting portion, said spindle shaft also defining a downwardly-directed end face configured for at least partial frictional engagement relative to said cutting blade;

b) a spindle support housing having a longitudinal bore, said spindle support housing configured for mounting to a lawn mower cutter housing;

c) at least one bearing intermediate said spindle shaft and said spindle support housing, said bearing including an inner race attached to said inner race mounting portion of said spindle shaft such that said spindle shaft may be rotatably supported relative to said spindle support housing by contact with said inner race of said bearing;

d) a through bolt and nut subassembly itself comprising:
a through bolt having a threaded first end and a head at its second, opposite end, said through bolt configured to extend through said hole in said blade, said hollow spindle shaft, and said pulley; and a nut configured to threadably engage said threaded first end of said through bolt, such that as said nut is threaded down said threaded first end of said through bolt, said nut and head of said through bolt combine to capture and compress said pulley, said bearing, and said blade, such that said blade is frictionally engaged relative to said spindle shaft to a degree sufficient to allow said spindle shaft to provide torque to said blade sufficient to cause rotation, and said pulley is positively engaged with said spindle assembly due to their respective irregular cross section, thus deterring relative rotation therebetween;

e) a pulley spacer below the belt-driven portion of said pulley, said pulley spacer including an annular recessed portion; and f) a retaining ring attached relative to said spindle shaft at a location on said spindle shaft intermediate said irregular portion and said bearing inner race mounting portion, said retaining ring configured to capture and retain said bearing on said elongate hollow spindle shaft even if said through bolt and nut subassembly is removed, said retaining ring when attached relative to said spindle shaft being located within an annular retaining ring clearance region at least partially defined by said spindle shaft and said pulley spacer.

9. The lawn mower cutting blade spindle assembly as claimed in claim 8, wherein said retaining ring is a snap ring.

10. The lawn mower cutting blade spindle assembly as claimed in claim 9, wherein said retaining ring is a snap ring made of wire having a substantially circular diameter.

11. The lawn mower cutting blade spindle assembly as claimed in claim 8, wherein said annular retaining ring clearance region is provided by a chamfer.

12. The lawn mower cutting blade assembly of claim 8, wherein said blade is in direct frictional engagement with said downwardly-directed end face of said elongate hollow spindle shaft when installed.

13. The lawn mower cutting blade assembly of claim 8, further comprising at least one spacer element configured for placement intermediate said cutting blade and said hollow spindle shaft blade wherein said relative partial frictional engagement between said downwardly-directed end face of said elongate hollow spindle shaft and said cutting blade is provided by said spacer element, the thickness and said spacer element used affecting the height of cut of said blade.

14. The lawn mower cutting blade assembly of claim 8, wherein said pulley spacer is separate from said pulley.

15. A lawn mower cutting blade spindle subassembly for use with a cutting blade having a central mounting hole and a pulley configured for being driven by a belt, said pulley having a central mounting hole having an irregular cross section, said subassembly comprising;

a) an elongate hollow spindle shaft interconnecting said pulley and said blade, said spindle shaft having an elongate bore extending the length thereof, said spindle shaft also including an upper end having an irregular portion having an irregular transverse cross section substantially conforming to that of said pulley mounting hole, said spindle shaft also having a bearing inner race mounting portion, said spindle shaft also defining a downwardly-directed end face configured for at least partial frictional engagement relative to said cutting blade;

b) a spindle support housing having a longitudinal bore, said spindle support housing configured for mounting to a lawn mower cutter housing;

c) at least one bearing intermediate said spindle shaft and said spindle support housing, said bearing including an inner race attached to said inner race mounting portion of said spindle shaft such that said spindle shaft may be rotatably supported relative to said spindle support housing by contact with said inner race of said bearing;

d) a through bolt and nut subassembly itself comprising:
a through bolt having a threaded first end and a head at its second, opposite end, said through bolt configured to extend through said hole in said blade, said hollow spindle shaft, and said pulley; and
a nut configured to threadably engage said threaded first end of said through bolt,
such that as said nut is threaded down said threaded first end of said through bolt, said nut and head of said through bolt combine to capture and compress said pulley, said bearing, and said blade, such that said blade is frictionally engaged relative to said spindle shaft to a degree sufficient to allow said spindle shaft to provide torque to said blade sufficient to cause rotation, and said pulley is positively engaged with said spindle assembly due to their respective irregular cross section, thus deterring relative rotation therebetween;

e) a pulley spacer below the belt-driven portion of said pulley, said pulley spacer including an annular recessed portion; and f) a retaining ring attached relative to said spindle shaft at a location on said spindle shaft intermediate said irregular portion and said bearing inner race mounting portion, said retaining ring configured to capture and retain said bearing on said elongate hollow spindle shaft even if said through bolt and nut subassembly is removed, said retaining ring when attached relative to said spindle shaft being enclosed within a closed annular retaining ring clearance region at least partially defined by said spindle shaft, said closed annular retaining ring clearance region located intermediate said bearing and said pulley.

16. The lawn mower cutting blade spindle assembly as claimed in claim 15, wherein said retaining ring is a snap ring.

17. The lawn mower cutting blade spindle assembly as claimed in claim 16, wherein said retaining ring is a snap ring made of wire having a substantially circular diameter.

18. The lawn mower cutting blade spindle assembly as claimed in claim 16, wherein said annular retaining ring clearance region is provided by a chamfer.

19. The lawn mower cutting blade assembly of claim 16, wherein said blade is in direct frictional engagement with said downwardly-directed end face of said elongate hollow spindle shaft when installed.

20. The lawn mower cutting blade assembly of claim 16, further comprising at least one spacer element configured for placement intermediate said cutting blade and said hollow spindle shaft blade wherein said relative partial frictional engagement between said downwardly-directed end face of said elongate hollow spindle shaft and said cutting blade is provided by said spacer element, the thickness and said spacer element used affecting the height of cut of said blade.

21. A lawn mower cutting blade spindle assembly, comprising;
a) a pulley configured for being driven by a belt, said pulley having a central mounting hole having an irregular cross section;

b) a cutting blade having a central mounting hole;

c) an elongate hollow spindle shaft interconnecting said pulley and said blade, said spindle shaft having an elongate bore extending the length thereof, said spindle shaft also including an upper end having an irregular portion having an irregular transverse cross section substantially conforming to that of said pulley mounting hole, said spindle shaft also having a bearing inner race mounting portion, said spindle shaft also defining a downwardly-directed end face configured for at least partial frictional engagement relative to said cutting blade;

d) a spindle support housing having a longitudinal bore, said spindle support housing configured for mounting to a lawn mower cutter housing;

e) at least one bearing intermediate said spindle shaft and said spindle support housing, said bearing including an inner race attached to said inner race mounting portion of said spindle shaft such that said spindle shaft may be rotatably supported relative to said spindle support housing by contact with said inner race of said bearing;

f) a through bolt and nut subassembly itself comprising:
a through bolt having a threaded first end and a head at its second, opposite end, said through bolt configured to extend through said hole in said blade, said hollow spindle shaft, and said pulley; and
a nut configured to threadably engage said threaded first end of said through bolt,
such that as said nut is threaded down said threaded first end of said through bolt, said nut and head of said through bolt combine to capture and compress said pulley, said bearing, and said blade, such that said blade is frictionally engaged relative to said spindle shaft to a degree sufficient to allow said spindle shaft to provide torque to said blade sufficient to cause rotation, and said pulley is positively engaged with said spindle assembly due to their respective irregular cross section, thus deterring relative rotation therebetween; and g) a retaining ring attached relative to said spindle shaft at a location on said spindle shaft intermediate said irregular portion and said bearing inner race mounting portion, said retaining ring configured to capture and retain said bearing on said elongate hollow spindle shaft even if said through bolt and nut subassembly is removed, said retaining ring when attached relative to said spindle shaft being located within an annular retaining ring clearance region at least partially defined by said spindle shaft and said at least one bearing.

22. The lawn mower cutting blade spindle assembly as claimed in claim 19, wherein said retaining ring is a snap ring.

23. The lawn mower cutting blade spindle assembly as claimed in claim 20, wherein said retaining ring is a snap ring made of wire having a substantially circular diameter.

24. The lawn mower cutting blade spindle assembly as claimed in claim 19, wherein said annular retaining ring clearance region is provided by a chamfer.

25. The lawn mower cutting blade spindle assembly as claimed in claim 22, further comprising a pulley spacer below the belt-driven portion of said pulley, wherein said annular retaining ring clearance region is provided by a chamfer in said pulley spacer.

26. The lawn mower cutting blade assembly of claim 19, wherein said blade is in direct frictional engagement with said downwardly-directed end face of said elongate hollow spindle shaft when installed.

27. The lawn mower cutting blade assembly of claim 19, further comprising at least one spacer element configured for placement intermediate said cutting blade and said hollow spindle shaft blade wherein said relative frictional engagement between said downwardly-directed end face of said elongate hollow spindle shaft and said cutting blade is provided by said spacer element, the thickness and said spacer element used affecting the height of cut of said blade.

28. A lawn mower cutting blade spindle assembly, comprising;
   a) a pulley configured for being driven by a belt, said pulley having a central mounting hole having an irregular cross section;
   b) a cutting blade having a central mounting hole;
   c) an elongate hollow spindle shaft interconnecting said pulley and said blade, said spindle shaft having an elongate bore extending the length thereof, said spindle shaft also including an upper end having an irregular portion having an irregular transverse cross section substantially conforming to that of said pulley mounting hole, said spindle shaft also having a bearing inner race mounting portion, said spindle shaft also defining a downwardly-directed end face configured for at least partial frictional engagement relative to said cutting blade;
   d) a spindle support housing having a longitudinal bore, said spindle support housing configured for mounting to a lawn mower cutter housing;
   e) at least one bearing intermediate said spindle shaft and said spindle support housing, said bearing including an inner race attached to said inner race mounting portion of said spindle shaft such that said spindle shaft may be rotatably supported relative to said spindle support housing by contact with said inner race of said bearing;
   f) a through bolt and nut subassembly itself comprising:
      a through bolt having a threaded first end and a head at its second, opposite end, said through bolt configured to extend through said hole in said blade, said hollow spindle shaft, and said pulley; and
      a nut configured to threadably engage said threaded first end of said through bolt,
      such that as said nut is threaded down said threaded first end of said through bolt, said nut and head of said through bolt combine to capture and compress said pulley, said bearing, and said blade, such that said blade is frictionally engaged relative to said spindle shaft to a degree sufficient to allow said spindle shaft to provide torque to said blade sufficient to cause rotation, and said pulley is positively engaged with said spindle assembly due to their respective irregular cross section, thus deterring relative rotation therebetween;
   g) a pulley spacer below the belt-driven portion of said pulley, said pulley spacer including an annular recessed portion; and
   h) a retaining ring attached relative to said spindle shaft at a location on said spindle shaft intermediate said irregular portion and said bearing inner race mounting portion, said retaining ring configured to capture and retain said bearing on said elongate hollow spindle shaft even if said through bolt and nut subassembly is removed, said retaining ring when attached relative to said spindle shaft being located within an annular retaining ring clearance region at least partially defined by said spindle shaft and said pulley spacer.

29. The lawn mower cutting blade spindle assembly as claimed in claim 26, wherein said retaining ring is a snap ring.

30. The lawn mower cutting blade spindle assembly as claimed in claim 27, wherein said retaining ring is a snap ring made of wire having a substantially circular diameter.

31. The lawn mower cutting blade spindle assembly as claimed in claim 26, wherein said annular retaining ring clearance region is provided by a chamfer.

32. The lawn mower cutting blade assembly of claim 26, wherein said blade is in direct frictional engagement with said downwardly-directed end face of said elongate hollow spindle shaft when installed.

33. The lawn mower cutting blade assembly of claim 26, further comprising at least one spacer element configured for placement intermediate said cutting blade and said hollow spindle shaft blade wherein said relative partial frictional engagement between said downwardly-directed end face of said elongate hollow spindle shaft and said cutting blade is provided by said spacer element, the thickness and said spacer element used affecting the height of cut of said blade.

34. The lawn mower cutting blade assembly of claim 26, wherein said pulley spacer is separate from said pulley.

35. A lawn mower cutting blade spindle assembly, comprising;
   a) a pulley configured for being driven by a belt, said pulley having a central mounting hole having an irregular cross section;
   b) a cutting blade having a central mounting hole;
   c) an elongate hollow spindle shaft interconnecting said pulley and said blade, said spindle shaft having an elongate bore extending the length thereof, said spindle shaft also including an upper end having an irregular portion having an irregular transverse cross section substantially conforming to that of said pulley mounting hole, said spindle shaft also having a bearing inner race mounting portion, said spindle shaft also defining a downwardly-directed end face configured for at least partial frictional engagement relative to said cutting blade;
   d) a spindle support housing having a longitudinal bore, said spindle support housing configured for mounting to a lawn mower cutter housing;
   e) at least one bearing intermediate said spindle shaft and said spindle support housing, said bearing including an inner race attached to said inner race mounting portion of said spindle shaft such that said spindle shaft may be rotatably supported relative to said spindle support housing by contact with said inner race of said bearing;
   f) a through bolt and nut subassembly itself comprising:
      a through bolt having a threaded first end and a head at its second, opposite end, said through bolt configured to extend through said hole in said blade, said hollow spindle shaft, and said pulley; and
      a nut configured to threadably engage said threaded first end of said through bolt,
      such that as said nut is threaded down said threaded first end of said through bolt, said nut and head of said through bolt combine to capture and compress said pulley, said bearing, and said blade, such that said blade is frictionally engaged relative to said spindle shaft to a degree sufficient to allow said spindle shaft to provide torque to said blade sufficient to cause rotation, and said pulley is positively engaged with said spindle assembly due to their respective irregular cross section, thus deterring relative rotation therebetween;

g) a pulley spacer below the belt-driven portion of said pulley, said pulley spacer including an annular recessed portion; and h) a retaining ring attached relative to said spindle shaft at a location on said spindle shaft intermediate said irregular portion and said bearing inner race mounting portion, said retaining ring configured to capture and retain said bearing on said elongate hollow spindle shaft even if said through bolt and nut subassembly is removed, said retaining ring when attached relative to said spindle shaft being enclosed within a closed annular retaining ring clearance region at least partially defined by said spindle shaft, said closed annular retaining ring clearance region located intermediate said bearing and said pulley.

36. The lawn mower cutting blade spindle assembly as claimed in claim 33, wherein said retaining ring is a snap ring.

37. The lawn mower cutting blade spindle assembly as claimed in claim 34, wherein said retaining ring is a snap ring made of wire having a substantially circular diameter.

38. The lawn mower cutting blade spindle assembly as claimed in claim 35, wherein said annular retaining ring clearance region is provided by a chamfer.

39. The lawn mower cutting blade assembly of claim 35, wherein said blade is in direct frictional engagement with said downwardly-directed end face of said elongate hollow spindle shaft when installed.

40. The lawn mower cutting blade assembly of claim 35, further comprising at least one spacer element configured for placement intermediate said cutting blade and said hollow spindle shaft blade wherein said relative partial frictional engagement between said downwardly-directed end face of said elongate hollow spindle shaft and said cutting blade is provided by said spacer element, the thickness and said spacer element used affecting the height of cut of said blade.

* * * * *